June 9, 1942.	G. F. RYAN	2,285,534
MECHANICAL MOVEMENT
Filed Jan. 27, 1940	3 Sheets-Sheet 1

June 9, 1942.  G. F. RYAN  2,285,534
MECHANICAL MOVEMENT
Filed Jan. 27, 1940  3 Sheets-Sheet 2

June 9, 1942.  G. F. RYAN  2,285,534
MECHANICAL MOVEMENT
Filed Jan. 27, 1940  3 Sheets-Sheet 3

INVENTOR:
George F. Ryan
By his attorney
Victor Cobb

Patented June 9, 1942

2,285,534

UNITED STATES PATENT OFFICE 2,285,534

MECHANICAL MOVEMENT

George F. Ryan, Peabody, Mass., assignor to United Shoe Machinery Corporation, Borough of Flemington, N. J., a corporation of New Jersey Application January 27, 1940, Serial No. 315,951

6 Claims. (Cl. 74—25)

This invention relates to a mechanical movement and is herein illustrated as embodied in a mechanism for transmitting motion between parts of a machine, such as a press.

It is an object of the invention to provide improved mechanism for transmitting motion from a power source to driven members, which will be especially effective and simple in operation, but at the same time will permit of considerable flexibility in the extent of movement produced. To this end, and as illustrated, I have provided a mechanical movement which comprises a rotary sleeve, a shaft mounted in the sleeve for rotation with the sleeve and also for rotation about its own axis relatively to the sleeve, together with means normally operative to rotate the sleeve and shaft as a unit and mechanism for rotating the shaft relatively to the sleeve, thus to vary the throw of a crank (preferably in the form of an eccentric) which is carried by the shaft and is normally rotated coaxially with the sleeve. The mechanism is operated by gears normally effective to drive the sleeve and shaft as a unit, and is provided with means for varying the relative speed of these gears, with the result that the throw of the eccentric can be varied from zero upwardly and then back to zero to produce power operation of a driven member to which it is connected. As the throw of the eccentric again approaches zero the driven member is slowed down and finally, when the eccentric again rotates about the axis of the sleeve, the driven member is held stationary. Thus the eccentric operates as a brake. Furthermore, since the operation of the eccentric in producing power operation of the driven member is effected by variation of the relative speeds of rotating members, no clutch is required.

These and other features of the invention will be apparent from the following specification, when taken in connection with the accompanying drawings, and are pointed out in the claims.

Figure 1:
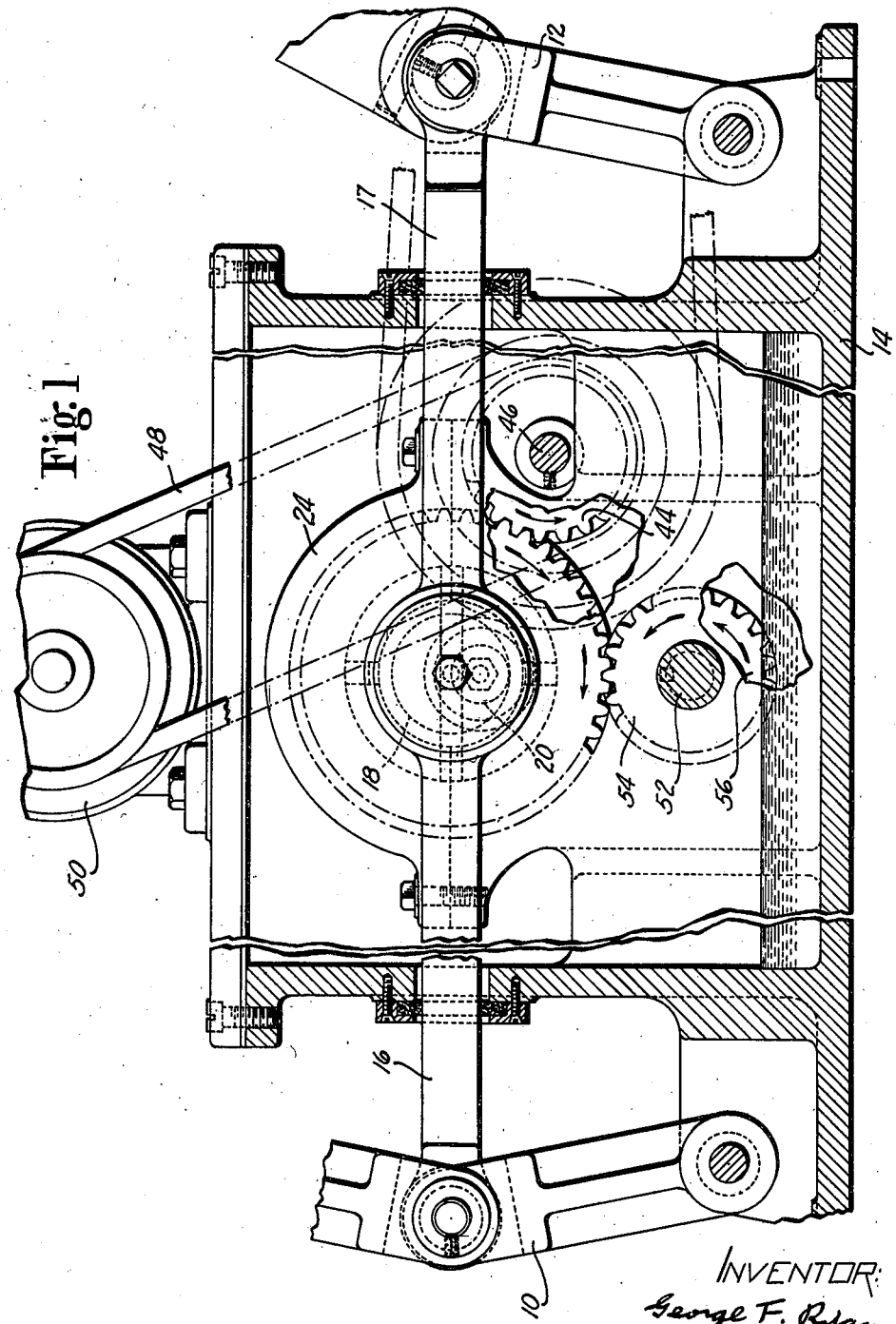
Fig. 1 is an end view, partly in section, showing the construction of the mechanical movement.
Figure 2:
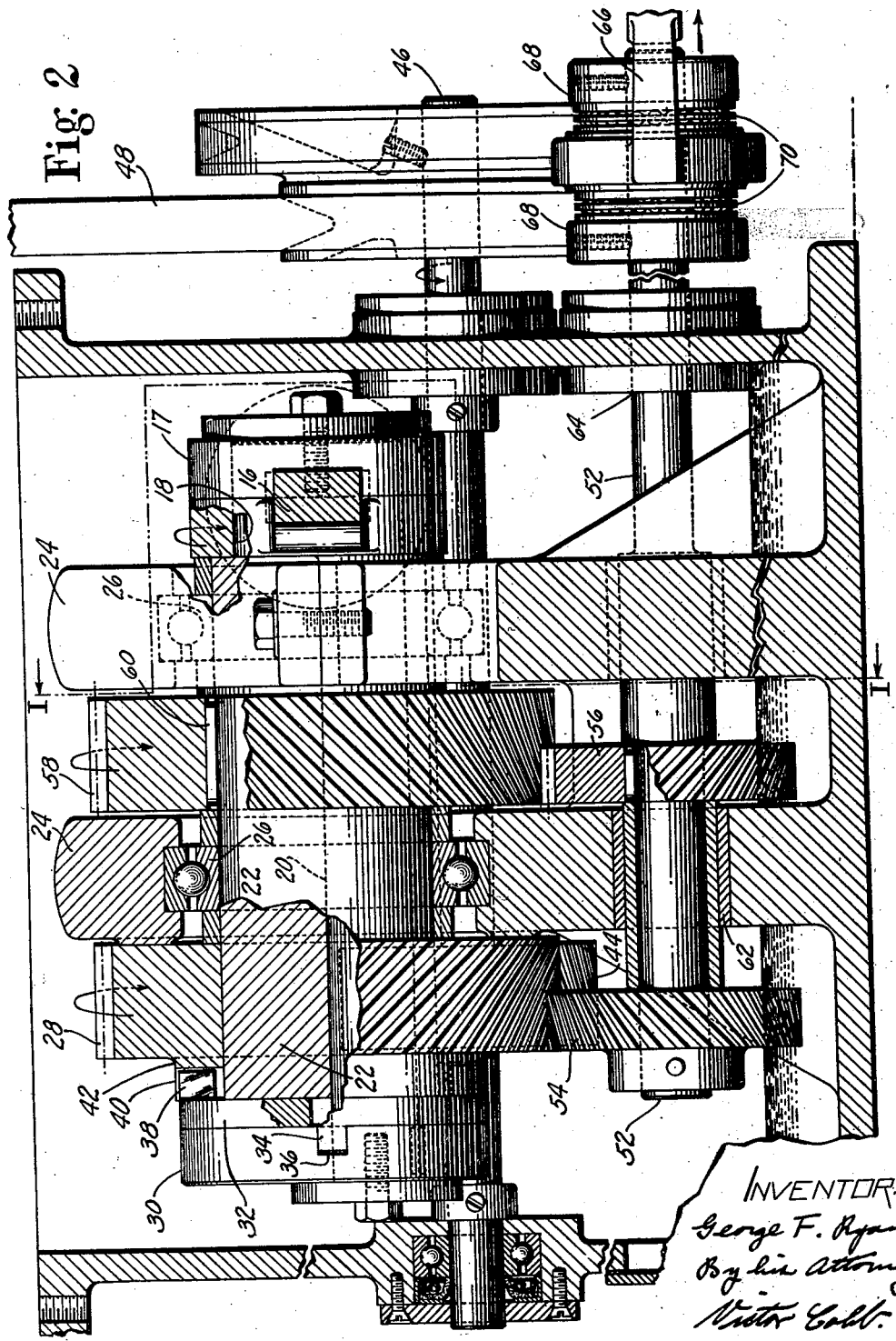
Fig. 2 is a view in side elevation, partly in section, of a portion of the mechanism shown in Fig. 1.
Figure 3:
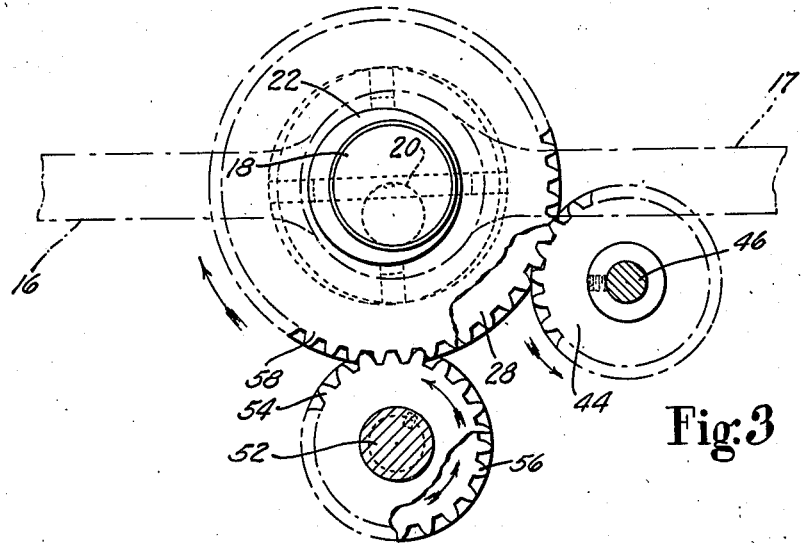
Fig. 3 is a diagrammatic view illustrating the relation of driving gears and the driven members.

Fig. 1 illustrates the invention as applied to a mechanical movement for actuating toggle mechanisms, such as used in presses of various types. As shown, toggles 10 and 12, which are secured to a base 14, are arranged to be driven respectively by links 16 and 17, the inner ends of which surround an eccentric 18 carried at the end of a shaft 20. The shaft 20 is rotatably mounted in a sleeve 22, which in turn is supported in journals 24 by antifriction bearings 26 (see Fig. 2). It is to be noted that the axis of the eccentric 18, when in its inoperative position, coincides with the axis of the sleeve 22 and that the shaft 20 is positioned in the sleeve with its axis spaced from the axis of the sleeve by a distance equal to the radius of the eccentric, that is, the distance between the axis of the shaft and the axis of the eccentric 18.

Figure 4:
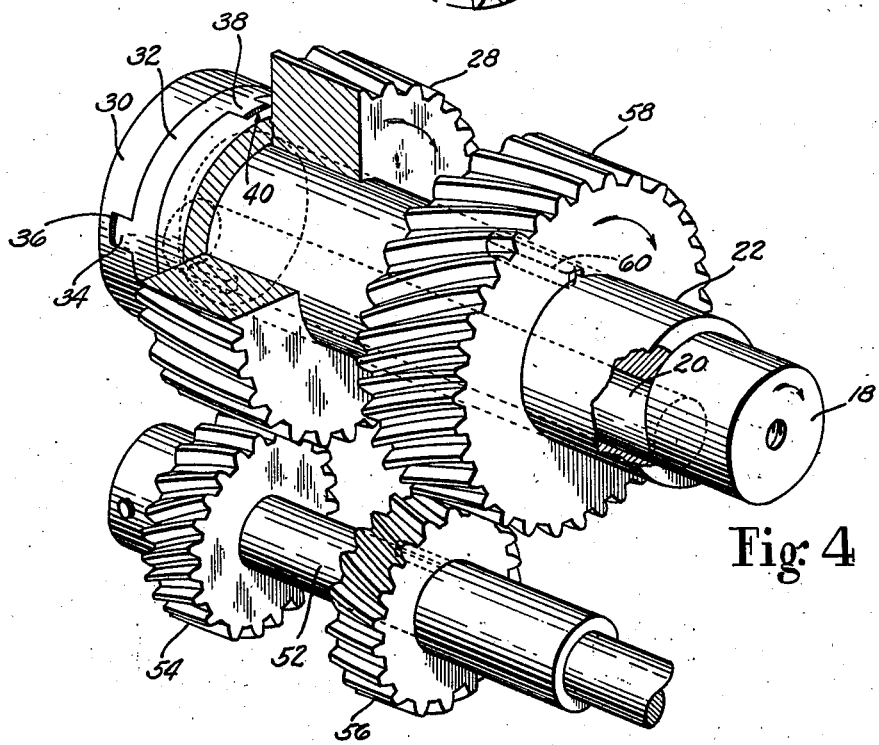
Fig. 4 is a perspective view illustrating parts of the mechanical movement.

The shaft 20 is connected with a 45° left-hand helical or spiral gear 28 loose on the sleeve 22 by means of an Oldham coupling comprising a floating plate 32, having projections 34 engaged in slots 36 in a disk 30 fast on the end of the shaft 20 and projections 38 which engage lugs 40 on a hub 42 of the gear 28. The gear 28 is rotated by a pinion 44 on a shaft 46, driven by means of a belt 48 connected to an electric motor 50. The sleeve 22 is normally adapted to be rotated from and in the same direction as the gear 28 through a stub shaft 52, which has keyed thereto a gear 54 in mesh with the gear 28, and a second gear 56 in mesh with a 45° right hand helical or spiral gear 58, which is keyed to the sleeve 22 at 60. Upon rotation of the gear 28, the sleeve 22 will be caused to rotate with the gear 28, carrying the shaft 20 bodily with it. The net result is that the eccentric, the shaft and the sleeve will rotate as a unit about the axis of the sleeve. If the eccentric 18 is positioned, as shown in Fig. 4, concentric with the sleeve 22, this will not cause any movement of the levers 16 and 17.

In order to cause the eccentric 18 to serve as a crank and therefore to move the levers 16 and 17, I have provided mechanism for causing the shaft 20 to rotate about its axis relatively to the sleeve 22, with the result that the eccentric will be moved from its position concentric with the axis of the sleeve. In order to accomplish this, the shaft 52 is arranged for sliding movement in its bearings 62 and 64. During movement of the shaft to the right, as in Fig. 2, the gear 54 will be caused to rotate slower than normally, due to the fact that as the teeth of the gear 54 are drawn over those of the gear 28, the gear 54 will have imparted to it an additional rotative movement, opposite in direction to its normal movement, thus causing the shaft 52 and the gear 56 to rotate at lower speed. Similarly, the movement of the teeth of the gear 56 past the teeth of the gear 58 will cause the latter to rotate at a still lower speed. The gears 58 and 28 no longer rotate at the same speed. Since the gear 58 is keyed to the sleeve 22 and the gear 28 is connected to the shaft 20 by the Oldham coupling, the shaft 20 is rotated relatively to the sleeve 22, thus moving the eccentric 18 about the axis of the shaft to a position dependent upon the extent of lengthwise movement of the shaft 52 and causing the eccentric to assume the position of a crank relatively to the axis of the sleeve 22. After the shaft 52 has ceased to move, the shaft 20 and the sleeve 22 will again rotate at the same speed and the eccentric will continue to revolve in its new position. The reverse of this action takes place when the shaft 52 is moved in the opposite direction, that is, to the left in Fig. 2. The movement of the shaft 52 is conveniently accomplished by means of a yoke 66 loose upon the shaft and positioned between two stops 68 thereon, there being ball bearings 70 between the yoke and the stops to reduce friction.

It is to be noted that the force required in moving the shaft 52 in either direction is small as compared to the force applied to the eccentric 18, in view of the fact that the eccentric is moved in or out by the force applied by the driving gear 44 to the gear 28. The force required to move the shaft 52 is only substantially that required to overcome friction of the bearings of the shaft and to overcome the inertia in increasing or decreasing the speed of the sleeve 22. Looked at from another point of view, the shaft 20 may be said to rotate once about its own axis while rotating once about the axis of the sleeve 22 at all times except while the shaft 52 is being moved lengthwise. Lengthwise movement of the shaft 52 destroys the synchronism of these two movements thus rotating the shaft 20 relatively to the sleeve 22 which at all times rotates at the same speed as the speed of rotation of the shaft 20 about the axis of the sleeve 22.

The mechanism above described is adapted to various modes of operation, depending upon the extent and rapidity of the movement of the shaft 52 in a longitudinal direction. If the shaft is moved slowly toward the right in Fig. 2, the effective throw of the eccentric will gradually be increased, and, when the movement of the shaft ceases, the eccentric will continue to revolve in its new position, causing a repetition of the cycle of movements transmitted to the levers 16 and 17. If, however, the shaft 52 is moved quickly to the right and then to the left, the movement being completed during a single rotation of the gear 28, the eccentric will be moved outward into its position of maximum effective throw, and then back to its inoperative position in which its axis is in line with the axis of the sleeve 22, thus causing a single operative movement of the levers 16 and 17. The lateral extent of the movement of the shaft 52 will determine the maximum effective throw of the eccentric 18, thus providing a simple control by which the throw can be varied as conditions require.

Having described my invention, what I claim as new and desire to secure by Letters Patent of the United States is:

1. A mechanical movement comprising a rotatable sleeve, a shaft carried by the sleeve and mounted for rotation about its own axis and for movement bodily about the axis of the sleeve, a crank carried by the shaft and normally extending radially of the sleeve and having its radius equal to the distance between the axis of the shaft and the axis of the sleeve, gears normally operative to cause angular movement of the shaft about its own axis and bodily movement of the shaft about the axis of the sleeve at the same speed thereby to rotate the crank on the axis of the sleeve, and means associated with the gears for varying their relative speeds of rotation thereby to cause the crank to revolve bodily about the axis of the sleeve.

2. A mechanical movement comprising a rotatable sleeve, a shaft mounted in the sleeve for rotation about an axis eccentric to the axis of the sleeve, an eccentric carried by the shaft, a gear for rotating the shaft, a second gear operatively connected to the first-mentioned gear for rotating the sleeve at the same speed in the same direction as the shaft thereby to rotate the eccentric about the axis of the sleeve, and means for varying the relative speeds of rotation of the gears and thereby to vary the relative speed of rotation of the shaft and sleeve thereby to vary the throw of the eccentric.

3. A mechanical movement comprising a rotary sleeve, a shaft mounted for rotation in the sleeve about an axis eccentric to the axis of the sleeve and for rotation with the sleeve, an eccentric carried by the shaft, a helical gear loosely mounted upon the sleeve, means for operatively connecting the gear and shaft to produce rotation of the shaft at the same speed as the gear, a second helical gear fast upon the sleeve, a shaft mounted on the frame of the machine and having two helical pinions respectively making engagement with the gears upon the sleeve, and means for moving the last-named shaft in a longitudinal direction to effect rotation of the sleeve and shaft at different speeds thereby rotating the eccentric about the axis of the first-named shaft to vary the throw of the eccentric relatively to the axis of the sleeve.

4. A mechanical movement comprising a rotatable sleeve, a shaft mounted in the sleeve for angular movement therewith bodily about the axis of the sleeve, a helical gear loosely mounted on the sleeve and operatively connected to the shaft, an eccentric on the shaft, means for rotating the gear to cause rotation of the shaft and eccentric, a second helical gear secured to the sleeve, another shaft, helical pinions secured thereto and having teeth respectively in mesh with the helical gears to effect rotation of the sleeve, and means for moving the last-named shaft longitudinally of its axis to effect variation in the speed of rotation of the sleeve relatively to the speed of rotation of the first-named shaft upon its axis thereby to vary the throw of the eccentric.

5. A mechanical movement comprising a shaft, an eccentric carried by the shaft, means mounting the shaft for revolution bodily about an axis normally coinciding with the axis of the eccentric and for rotation about its own axis, driving means for causing angular movement of the shaft about the two axes at the same angular velocity and in the same direction thereby to effect rotation of the eccentric about its axis, and means associated with the driving means for varying the relative velocities of the shaft about the two axes thereby to effect rotation of the eccentric about an axis other than its own.

6. A mechanical movement comprising a rotatable sleeve, a shaft mounted in the sleeve for movement bodily about the axis of the sleeve upon rotation of the latter, an eccentric carried by the shaft and normally positioned so that its axis coincides with the axis of the sleeve, driving means for rotating the sleeve and the shaft about their respective axes at the same angular velocity and in the same direction thereby to effect rotation of the eccentric about its axis, and means associated with the driving means for varying the relative velocities of the sleeve and shaft about their respective axes thereby to effect rotation of the eccentric about an axis other than its own.

GEORGE F. RYAN.